(12) United States Patent
Genevie

(10) Patent No.: US 6,607,389 B2
(45) Date of Patent: Aug. 19, 2003

(54) SYSTEMS AND METHODS FOR MAKING JURY SELECTION DETERMINATIONS

(76) Inventor: Louis Genevie, 350 W. 50th St., Suite 10B, New York, NY (US) 10019

( * ) Notice: Subject to any disclaimer, the term of this patent is extended or adjusted under 35 U.S.C. 154(b) by 0 days.

(21) Appl. No.: 10/007,947

(22) Filed: Dec. 3, 2001

(65) Prior Publication Data

US 2003/0031991 A1 Feb. 13, 2003

Related U.S. Application Data

(60) Provisional application No. 60/309,511, filed on Aug. 3, 2001.

(51) Int. Cl.$^7$ .......................... G09B 19/00; G06F 17/00
(52) U.S. Cl. .......................... 434/235; 705/12; 705/500; 434/236
(58) Field of Search .................... 705/12, 500; 434/235

(56) References Cited

U.S. PATENT DOCUMENTS

| | | | | |
|---|---|---|---|---|
| 5,444,615 A | | 8/1995 | Bennett et al. | 364/401 |
| 5,815,392 A | | 9/1998 | Bennett et al. | 364/401 |
| 5,940,800 A | | 8/1999 | Bennett et al. | 705/1 |
| 6,091,408 A | | 7/2000 | Treibitz et al. | 345/329 |
| 6,125,340 A | | 9/2000 | Miles | 702/181 |
| 6,205,323 B1 | | 3/2001 | Mayo, Jr. | 455/38.2 |
| 2001/0053967 A1 | * | 12/2001 | Gordon et al. | 703/22 |
| 2003/0018520 A1 | * | 1/2003 | Rosen | 705/12 |

FOREIGN PATENT DOCUMENTS

WO    WO 0143050 A1 * 6/2001 ............ G06F/19/00

OTHER PUBLICATIONS

James J. Gobert and Walter E. Jordan, Jury Selection (the Law, Art, and Science of Selecting a Jury) Second Edition, "Mock and Shadow Juries" Chapter 5, pp. 128–140 (McGraw Hill, Inc. 1990).

* cited by examiner

Primary Examiner—Derris H. Banks
Assistant Examiner—Dmitry Suhol
(74) Attorney, Agent, or Firm—Fitzpatrick, Cella, Harper & Scinto

(57) ABSTRACT

A method provided for conducting a mock trial exercise in a lawsuit utilizes an attorney for a first party and an attorney for a second, opposing party. An initial pool of potential mock jurors is assembled and questioned in a manner that resembles as closely as possible a manner in which the venire will be questioned during the actual trial. Members of the initial pool are struck for cause, and the attorneys are permitted to make a predetermined number of peremptory strikes. A probable jury comprising members of the initial pool not struck for cause and not struck using a peremptory strike; and a stricken jury comprising members of the initial pool struck for cause or struck using a peremptory strike are assembled. Then, the first mock attorney and the second mock attorney present to both the probable jury and the stricken jury at least a summary of the case to be presented at trial. By analyzing the behavior of the probable and stricken jurors during deliberations, and by interviewing them thereafter, the trial team is able to focus their trail preparations on the issues likely to be important to the actual jury, and to assess whether its perceptions of each individual juror were accurate or inaccurate, thereby improving its abilities to conduct questioning of the venire, to move for strikes for cause, to make peremptory challenges and gaining an understanding of the viewpoints and arguments of stricken jurors.

20 Claims, 2 Drawing Sheets

SYSTEMS AND METHODS FOR MAKING JURY SELECTION DETERMINATIONS

CROSS-REFERENCE TO RELATED APPLICATION

This application claims the benefit of U.S. Provisional Application Serial No. 60/309,511, filed Aug. 3, 2001, and hereby incorporated by reference in its entirety.

BACKGROUND OF THE INVENTION

1. Field of the Invention

This present invention relates to systems and methods for conducting jury research. More specifically, the present invention relates to processes for providing experiential voir dire training for trial attorneys, and for generating research data and analytic tools that help prepare attorneys for more accurate decision making during the actual trial.

2. Description of Related Art

Over the years, jury consultants have played an increasingly important role in developing strategies and tactics for both civil and criminal litigations. Speaking generally, jury consultants assist attorneys by identifying and applying information concerning the beliefs, attitudes and characteristics of potential jurors.

Conventional services provided by jury consultants include focus groups, mock trials, opening statement consultations, community attitude surveys, graphics support, witness assessment preparation and the like. In essence, the jury consultant serves as an interface between the attorney and the jury pool, assisting the attorney by making recommendations for getting points across in a persuasive and effective manner.

Conventional methods employed by jury consultants tend to focus on strategy development, and statistical analysis that attempts to model juror types. For example, in a conventional mock trial exercise, the jury consultant attempts to construct a jury that is a random and representative sample of the overall jury pool in the relevant area (a "representative jury"). The construction of such a representative jury often begins with a telephone survey, in which a statistically significant sample of the community in which the case is to be tried is questioned, to determine its attitude patterns and demographic make-up. Depending on the specific nature of the case, the survey may focus on a variety of factors, including marital status, occupation, membership in community groups and the like, as well as other factors more specifically related to the particular case. The jury consultant then makes an effort to construct a representative jury that mirrors that community's profile.

A mock trial is then conducted before the representative jury, in which both the plaintiff's (or prosecutor's) and defendant's sides of the case are presented. Following the mock trial, the representative jury deliberates and renders a verdict. Each member of the representative jury is then polled and interviewed, to elicit his or her reactions to what was presented. The jury consultant compiles and analyzes that data from such interviews, and makes recommendations to the attorney concerning the manner in which the case may be most effectively presented. Data concerning biases and characteristics of jurors that may help or hurt the case is also analyzed.

For example, following an observation of the mock deliberations, the jury consultant may conclude that an aggressive cross-examination of a particular witness did not sit well with the jury, and in fact alienated the cross-examining attorney from its sympathies, and therefore recommend that a less aggressive approach to the cross be taken. By way of another example, the exercise outlined above may reveal that seventy percent of the representative jurors who were blue-collar workers found for the plaintiff, while eighty percent of the representative jurors who were white collar workers found for the defendant. From this data, the jury consultant may conclude that there are strong corresponding pro-plaintiff and pro-defendant biases in the subject case, and recommend to the attorney that his peremptory strikes (i.e. strikes as to which a showing of cause is not required) be used accordingly.

Over the long run, the statistical data obtained using the representative jury approach described above may prove useful, and conventional jury consultant have in fact provided valuable and necessary services to attorneys trying cases. However, even the strongest correlation between jurors' decision making and various aspects of their background, attitudes and experiences provides nothing more than probabilities, and falls short when tested against the complexity of decision making during voir dire. This drawback is even more acute when one considers that it is individuals who do not think like everyone else, and therefore do not conform to the probability data, who tend to become leaders in jury deliberations. These factors severely limit the usefulness of probability data in conducting a voir dire. In the end, no matter how much statistical data one has available, counsel are still required to rely on personal judgment, experience and so-called gut instincts when making actual jury selection determinations.

Despite these truisms, there has been very little qualitative research focused on the critical area of jury selection. Moreover, no systems or methods have been heretofore developed for effectively training an attorney to make jury selections in the specific case he will be trying, or for constructing a mock jury which mirrors the jury that will hear the case more accurately than the representative jury of the prior art. It has been suggested to conduct mock voir dires to generate the mock jury for a mock trial. See Jury Selection The Law, Art, and Science of Selecting a Jury, 2nd Ed., J. J. Gobert and W. E. Jordan (Shepard's/McGraw Hill 1990) at 130–131. However, no systematic approaches for conducting such mock voir dires, and for analyzing and utilizing the resultant data, have been heretofore developed. Moreover, such practices have been criticized as being time consuming. Id.

Also, an attorney training organization the National Institute for Trial Advocacy (NITA) has offered programs in which mock voir dires are conducted. At the NITA program, a attorney being trained conduct of mock voir dire before a trial advocacy instructor or a professional communicator, with the end product of the exercise being a a critique on the attorney's questions and presentation skills. The NITA programs, however, do not at all focus on the gathering and analysis of data from the mock voir dire process.

There is a need, therefore, for a system and method that fills these voids, and provides a trial attorney with formal voir dire training, while at the same time developing an ever more refined set of analytic and data gathering tools for improving voir dire practice.

SUMMARY OF THE INVENTION

It is an object of the present invention to provide systems and methods for assisting a trial attorney or a trial team in conducting jury research prior to trial.

It is another object of the present invention to provide systems and methods in which mock trial exercises are conducted before mock juries that resemble more closely the actual jury that will hear the case.

It is a still another object of the present invention to provide systems and methods that provide a trial attorney and a trial team with jury selection experience that is specifically relevant to the case that will be tried.

It is yet another object of the present invention to provide jury consulting methodologies that yield greater accuracy in outcome prediction, and a better understanding of what issues the actual jury will find important.

It is yet another object of the present invention to provide jury consulting methodologies that provide an intense clash of the issues in the case, creating a better understanding of how key case issues work their way through the deliberation process.

It is yet another object of the present invention to provide jury consulting methodologies that allow for the analysis of strike decisions in relation to what mock jurors actually do during deliberations, thereby allowing the attorney or trail team to see firsthand whether and to what extent their perceptions of individual jurors were accurate, where their perceptions fell short, and why.

It is still another object of the present invention to provide jury consulting methodologies that create a data base of stealth plaintiff and defense jurors and leadership types, creating a database of difficult to identify jurors.

In accordance with one embodiment of the present invention, a method is provided for conducting a mock trial exercise prior to conducting an actual trial in a lawsuit, utilizing a first attorney for a first party in the lawsuit and a second attorney for a second, opposing party in the lawsuit. The method comprises the steps of assembling an initial pool of potential mock jurors; questioning members of the initial pool in a manner that resembles as closely as possible a manner in which the venire will be questioned during the actual trial; striking members of the initial pool for cause in a manner that resembles as closely as possible a manner in which members of the venire will be struck for cause during the actual trial; permitting the first and second mock attorneys to make a predetermined number of peremptory strikes of members of the initial pool, the number of peremptory strikes permitted to each attorney corresponding as closely as possible to the number of peremptory strikes that will be permitted at the actual trial; assembling a probable jury comprising members of the initial pool not struck for cause and not struck using a peremptory strike; assembling a stricken jury comprising members of the initial pool struck for cause or struck using a peremptory strike; and presenting by the first mock attorney and the second mock attorney to both the probable jury and the stricken jury at least a summary of the case to be presented at trial.

DETAILED DESCRIPTION OF THE PREFERRED EMBODIMENTS

Speaking generally, the present invention is practiced by conducting a mock jury selection process, following the rules of the court in which the case is to be tried, to develop one or more probable juries and one or more stricken juries. As the terms are used herein, a probable jury is a panel consisting of those individuals who have been selected during a mock jury selection process, after all for cause and peremptory challenges have been made; and a stricken jury is a panel consisting of those individuals who have been struck, either for cause or using a peremptory challenge, during the mock jury selection process. By putting the attorney through the actual voir dire process, the attorney is provided with a directly relevant training experience, and a panel that more closely mirrors the panel that is likely to sit in the actual trial is produced.

In order for the practice of the methods of the present invention to yield its maximum benefits to the commissioning trial team or attorney, the mock voir dire should be conducted in a manner that resembles the manner in which the actual voir dire will be conducted at trial. Thus, knowledge of all applicable statutes and rules that will govern the trial is important, as is knowledge of the rules and predilections of the judge who will be presiding. Accordingly, to the extent that it is possible, such statues, rules and predilections should be learned before and followed. By way of example, if a case is to be tried before a certain judge who is know to use a specific questionnaire in examining the venire, then a questionnaire of that type should be used during the mock voir dire exercise. By way of another example, if the subject case is a federal civil lawsuit, in which by statute each side is permitted three peremptory challenges, then each side should be permitted three peremptory challenges during the mock exercise. Speaking generally, the more closely the mock exercise resembles the actual exercise, the more useful the data obtained from the mock exercise will be.

Figure 1:
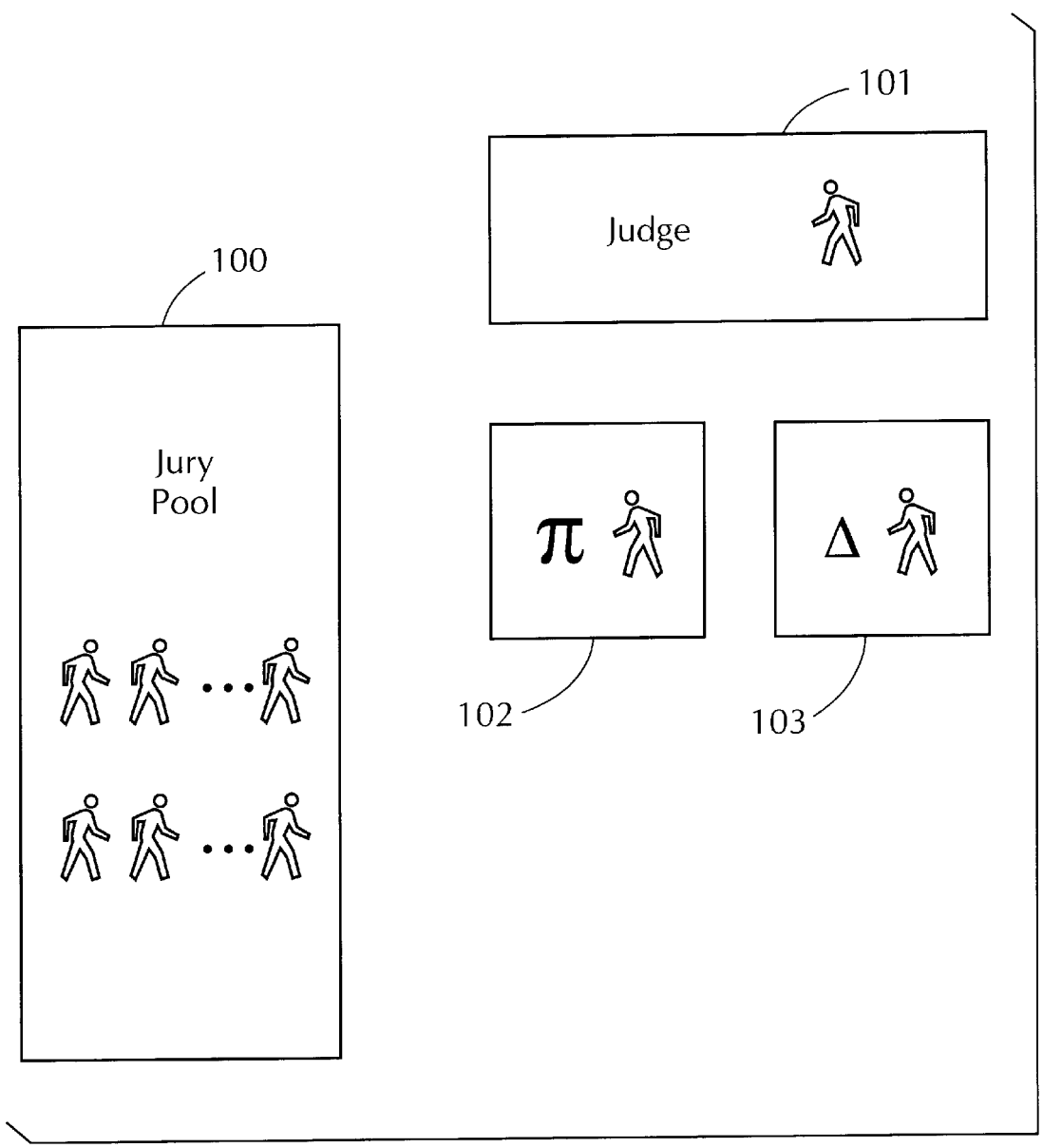
FIG. 1 is a block diagram illustrating the various parties that may be involved in the practice of the present invention.

With reference to FIG. 1, the participants in the mock exercise include a mock judge 101, an attorney or attorneys 102 for the plaintiff (or the prosecutor), an attorney or attorneys for the defendant, and a mock jury pool 100 from which the probable jury or juries and stricken jury or juries will be obtained. If the actual case is more complex (such as for example a multi-defendant case) then it is preferable to include additional participants in the mock exercise (such as for example an attorney for each defendant). The mock exercise may be conducted in any suitable location, such as for example in a mock courtroom maintained at the jury consultant's facility, or at the law offices of the attorney commissioning the exercise. Other locations are possible as well. Typically, the role of the attorney for the side commissioning the exercise will be played by the attorney who will act as lead counsel for that side at trial; and the attorney for the opposing side will be a colleague (such as, for example, a partner or associate) of such lead counsel. The role of the mock judge may be played by the jury consultant, by another colleague of the lead attorney or by a third-party, such as for example a retired judge, retained specifically for the exercise. Other configurations are possible as well, although it is most preferable that the attorney who will act as lead counsel for the commissioning side at trial play that role during the mock exercise, since that will maximize the training benefit of the present invention. It is important that each participant play his or her role as honestly and zealously as possible, for the exercise to yield the maximum benefits.

The jury pool 100 from which the probable juries and stricken juries are to be obtained should provide a representative sample of the community in which the case is tried, such that it mirrors the actual jury pool as closely as possible. Thus, those who are disqualified from jury service, such as for example minors, should not be included in the jury pool 100. Also, if there are certain groups in the community who are permitted to and do routinely exempt themselves from service, such as for example doctors, lawyers and police officers, then no such individuals should be allowed in the jury pool 100. Speaking generally, the jury pool 100 may be collected in the same manner in which the representative juries used in conventional jury consulting methodologies are obtained, taking into account demographic considerations and the like. The number of people needed for the jury pool 100 will typically be greater than the number of people needed to construct a representative jury, since it is from this pool that two juries (i.e., a probable jury and stricken jury), or more, will be created. The actual number of people needed for the jury pool 100 varies with the number of groups desired (i e., the number of probable juries and stricken juries desired); the number of jurors that will sit or are likely to sit on the panel at trial; and the manner in which strikes for cause and peremptory challenges are handled during the exercise.

Once the jury pool 100 is constructed and assembled, each member of the pool fills out a detailed questionnaire, eliciting some core information about the potential juror, as well as information concerning the potential juror's attitudes, experiences and biases related to the case. An exemplary completed questionnaire may look as follows:

| Name: | John Smith |
|---|---|
| Age: | 35 |
| Sex: | Male |
| Health: | Good |
| Occupation: | Electrical Equipment Sales |
| Military Service: | Navy, 4 years |
| Education: | B.A. |
| Married: | Yes |
| Children: | 2: 3 years and 5 years |

Preferably, the questionnaire will call also for additional information, more specific to the case at hand. For example, if the case is a civil suit brought by a patent holder against an alleged infringer, the questionnaire might call for some history regarding the potential juror's prior experience with patents, such as for example asking whether the potential juror has ever been named as an inventor. In any event, the specifics of the questionnaire should mirror as closely as possible those of the questionnaire that the presiding judge is likely to use during the actual trial.

Once each member of the jury pool 100 has filled out his or her questionnaire, the mock voir dire process commences. As discussed above, the format that is used to conduct the mock voir dire process should conform to the voir dire process that will be used by the trial judge as closely as possible. Thus, the uses of initial panel conditioning, judge conducted voir dire, counsel conducted voir dire, open voir dire, etc., in the mock exercise, are all dependent upon their uses in the actual trial, to the extent that that is known. If the presiding court will allow the attorneys to examine completed juror questionnaires during the actual process, then the attorneys should be shown prior to or during the mock voir dire, the questionnaires completed by the potential mock jurors. In some courts, the manner in which jury selection is conducted is prescribed closely by rule or statute, and in such cases those rules or statutes should be adhered to. In other courts, the trial judge is given tremendous discretion as to how jury selection is to proceed, and in those cases it is preferable for the specific judge's methodologies to be known and adhered to.

It is central to the present invention that the process provide for the striking of potential jurors, on both for cause and peremptory bases. For cause strikes may be made at the initiative of the judge 101, or may be requested by either attorney 102 or 103, and ruled upon by the judge 101. The strikes for cause should be made and/or ruled upon by the judge 101 in a manner that approximates the manner in which the actual judge will rule upon them as closely as possible. For example, if the judge is known to liberally allow strikes for cause, then strikes for cause should be liberally allowed during the mock exercise.

The number of peremptory challenges allowed to each side during the mock exercise should match the number of challenges that will be allowed at trial. Often, this number is fixed by statute. For example, in a federal civil case, each side is allowed a maximum of three peremptory challenges, and if this is the type of case being emulated then that is the number of peremptory strikes that should be allowed. The judge 101 should also evaluate the appropriateness of peremptory strikes, and in certain limited situations (such as for example Batson violation situations) not allow a particular peremptory strike to be made. Such circumstances should be relatively unusual, however, and by and large the peremptory challenges made by the attorneys 102 and 103 will result in a corresponding strike.

Figure 2:
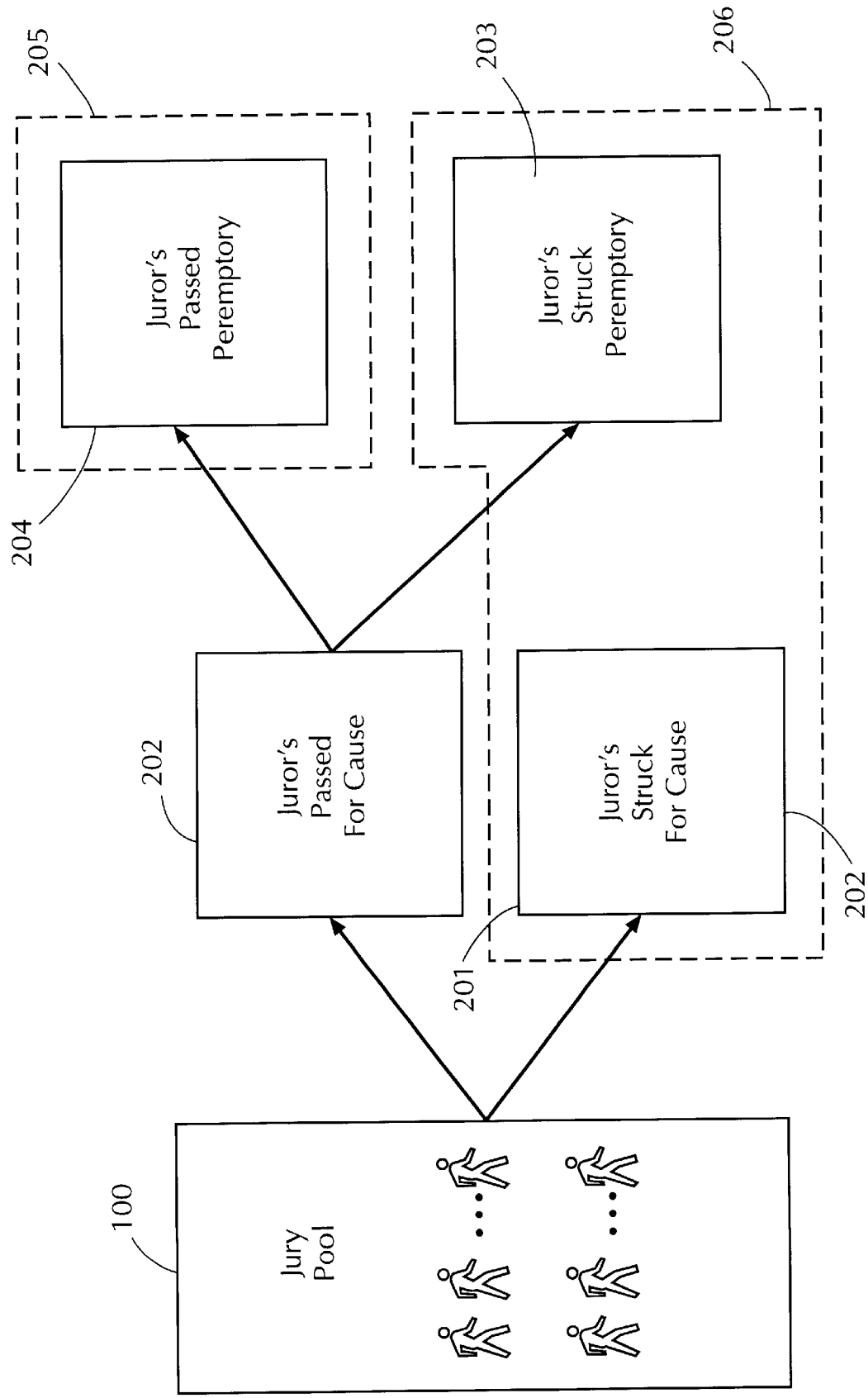
FIG. 2 is a block diagram illustrating the composition of a probable jury and a stricken jury.

FIG. 2 depicts schematically the manner in which a probable jury and a stricken jury are obtained from the jury pool 100. Following the examination of jury pool members (by questionnaire and/or by oral examination, as the case may be), certain jury pool members are struck for cause, either at the initiation of the judge 101, or at the request of the attorneys 102 and 103 as decided upon by the judge 101. Two or more groups are thereby extracted from the jury pool 100: a group 201 of potential jurors who were struck for cause; and a group 202 of potential jurors who passed the for cause evaluation. Next, the attorneys 102 and 103 each apply their peremptory strikes to the group of potential jurors 202, to refine that group into two more groups: a group 203 of potential jurors struck by either attorney's use of a peremptory challenge, and a group of jurors 204 who passed the peremptory strike procedure. As illustrated in FIG. 2, the probable jury 205 comprises those jurors who have passed both the strike for cause and peremptory challenge procedures; and the stricken jury 206 comprises those potential jurors 201 who have been struck for cause and those potential jurors 203 who have been struck using peremptory challenges.

A mock trial exercise is then conducted before both the probable jury 205 and the stricken jury 206. The term mock trial is being used here in its broadest sense, to mean an exercise in which both the plaintiff's (or prosecutor's) and defendant's cases are presented. The mock trial exercise could range from having each attorney 102 and 103 present a brief summary of his or her case; to an exercise in which opening statements, closing arguments and key witness testimony are presented; to a complete mock trial that very closely approximates the actual trial that will be conducted. Graphics, computer animation, demonstrative exhibits and physical evidence, to the extent that it will be used or is likely to be used at trial, may be presented as well.

In a case in which witness testimony is presented, the roles of the witnesses to be presented by the commissioning side are preferably played by the actual witnesses themselves, to the extent that they are available for the exercise. The witnesses to be presented by the opposing side, on the other hand, and to the extent that they are known, generally will not be available for the mock exercise, and their roles accordingly need to be played by others involved in the exercise, such as for example colleagues of the commissioning attorney, or members of the jury consultation team. Preferably, the judge 101 will preside over the mock trial exercise, and rule on all objections in a manner that approximates the manner in which the actual trial judge will likely rule as closely as possible.

Following the presentation of the mock trial exercise before the probable jury 205 and the stricken jury 206, each jury deliberates separately, and renders its verdict on the outcome of the case. Preferably, before the deliberations begin, the judge 101 will instruct the juries, and present the juries with specific charges, that mirror the instructions and charges that are likely to be given to the jury at trial. The deliberations of the probable jury 205 and the stricken jury 206 may be conducted in secret, or alternatively, and in many instances preferably, may be observed by the attorney or attorneys commissioning the exercise, and by the jury consultation team. In the latter case the two juries might deliberate one after the other, so that each of the deliberations may be effectively observed. Whether or not the actual deliberations are observed, each juror (both probable and stricken) should be interviewed following the deliberations, to elicit his or her reactions to the cases that were presented. Preferably, both the deliberations and the interviews are videotaped or recorded in some other suitable fashion, for subsequent detailed review by the attorney and/or consultants.

Since the probable jury 205 is a closer emulation of the actual jury that will hear the case than the representative jury of the prior art, the probable jury 205 and the reactions of its members provides a clear identification and understanding of the facts and issues in the case that are most likely to impact a real jury. At the same time, by utilizing in addition the stricken jury 206, head to head discussions by jurors perceived as most likely to strongly support each side of the case, and an intense clashes of key issues, are provided. Thus, the use of the methodologies of the present invention provide at least two innovative and extremely useful analytical data sets: the ability to focus on the reactions of probable jurors to arguments and evidence; and the ability to analyze strike decisions in relation to what jurors actually do during mock deliberations. The former will help the trial team focus their trail preparations on the issues likely to be important to the actual jury. The latter will allow the trial team to assess whether its perceptions of each individual juror were accurate or inaccurate, thereby improving its abilities to conduct questioning of the venire, to move for strikes for cause and to make peremptory challenges and gaining an understanding of the viewpoints and arguments of stricken jurors.

Speaking generally, something can be learned from analyzing the behavior of each juror during voir dire, during deliberations and during the post deliberation interview. Of particular value is the behavior of difficult to predict jurors, especially stealth jurors who hide their true predilections during the voir dire process. Thus, each juror is assessed initially by comparing voir dire responses to his or her behavior during deliberations.

All resultant data is analyzed in an effort to determine errors made by the commissioning attorney during the mock voir dire process. The inclusion in the probable jury 205 of a juror who favors the opposition's side, and in particular the inclusion of an opposition leader, is classified as a Type I error, and is given the highest priority. All available data—including questionnaire responses, oral voir dire responses, juror behavior during deliberations and juror reactions during the follow up interview—are brought to bear on identifying relevant characteristics of such un-struck opposition jurors. The presence in the stricken jury 206 of a juror favorable to the striking attorney's side, or of a juror who does not play a significant role during deliberations, is classified as a Type II error. Such errors are also analyzed in an effort to understand them, since they result in the useless strikes, or worse in strikes that do more harm than good.

When necessary, follow up interviews are conducted with mock jurors who were not evaluated correctly in order to understand why a correct evaluation was not made. Questions include: What was missed during the voir dire process? and What questions should have been asked that would have helped identify the individual's bias correctly? and the like. Broad ranging, detailed, one on one interviews focused on relevant aspects of the individual's experience are recommended.

In addition to the voir dire data, the claimed method also produces probable and stricken juries which are analyzed separately for their strategic and predictive value. Probable and stricken juries are also compared to determine if and in what ways probable juries see the case differently than stricken juries. This data is important as it may suggest a strategic refocusing of the case.

Also, because so few cases ever go to trial, most attorneys have limited voir dire experience. Attorneys' participation in this program produces substantial voir dire experience. The present invention provides trial attorneys with significant experience with respect to the development of voir dire and jury selection skills, consistent with the type of voir dire in which he or she is likely to participate.

The foregoing detailed description is intended to be illustrative and not limiting of the present invention, which is defined by the claims set forth below. For example, although the methods above are described for the sake of simplicity in terms of a single probable jury 205 and a single stricken jury 206, the mock voir dire process of the present invention could be conducted multiple times, generating multiple probable juries and stricken juries, all of which hear the case during the mock trial exercise. Various other modifications are possible as well.

What is claimed is:

1. A method of conducting a mock trial exercise in a lawsuit pending before a court at law, the method utilizing a first attorney for a first party in the lawsuit and a second attorney for a second, opposing party in the lawsuit, and comprising:

assembling an initial pool of potential mock jurors;

questioning members of the initial pool, in a manner that resembles as closely as possible a manner in which a venire will be questioned during the actual trial;

striking members of the initial pool for cause, in a manner that resembles as closely as possible a manner in which members of the venire will be struck for cause during the actual trial;

permitting the first attorney and the second attorney each to make a predetermined number of peremptory strikes of members of the initial pool, the number of peremptory strikes permitted to each attorney corresponding as closely as possible to the number of peremptory strikes that will be permitted at the actual trial;

assembling a probable jury comprising members of the initial pool not struck for cause and not struck using a peremptory strike;

assembling a stricken jury comprising members of the initial pool struck for cause or struck using a peremptory strike;

presenting by the first attorney and the second attorney to both the probable jury and the stricken jury at least a summary of the case to be presented at trial.

2. The method of claim 1, further comprising:

deliberating by the probable jury to obtain a probable jury verdict; and deliberating by the stricken jury to obtain a stricken jury verdict.

3. The method according to claim 2, comprising:

videotaping the deliberations of the probable jury and the deliberations of the stricken jury.

4. The method according to claim 2, comprising:

interviewing a plurality of members of the probable jury following the deliberations of the probable jury; and interviewing a plurality of members of the stricken jury following the deliberations of the stricken jury.

5. The method of claim 2, wherein the behaviors of members of the probable jury during deliberations are analyzed, to identify any errors that have been made in failing to strike an opposition juror.

6. The method according to claim 5, further comprising:

interviewing the identified opposition jurors following deliberations.

7. The method of claim 2, wherein the behaviors of members of the stricken jury during deliberations are analyzed, to identify any errors that may have been made in striking a favorable juror.

8. The method according to claim 7, further comprising:

interviewing the identified favorable jurors following deliberations.

9. The method of claim 1, wherein the lawsuit is a civil lawsuit in a United States federal court, and the predetermined number of peremptory strikes permitted to each attorney is three.

10. The method of claim 1, wherein the lawsuit is a civil lawsuit in a state court in one of the United States, and the predetermined number of peremptory strikes permitted to each attorney is dependent upon the laws and/or rules of the state.

11. The method according to claim 1, wherein the step of questioning members of the initial pool includes eliciting responses of members of the initial pool using a written questionnaire.

12. The method according to claim 1, wherein the step of questioning members of the initial pool includes orally examining members of the initial pool by a mock judge presiding over the mock trial exercise.

13. The method according to claim 1, wherein the step of questioning members of the initial pool includes orally examining members of the initial pool by the first attorney and the second attorney.

14. The method according to claim 1, wherein the a striking of a member of the initial pool for cause is initiated by a mock judge presiding over the mock trial exercise.

15. The method according to claim 1, wherein the striking of a member of the initial pool for cause is requested by either of the first attorney and the second attorney and ruled upon by a mock judge presiding over the mock trial exercise.

16. A method of conducting a mock trial exercise in a lawsuit pending before a court at law, the method comprising:

assembling an initial pool of potential mock jurors;

questioning members of the initial pool, in a manner that resembles as closely as possible a manner in which a venire will be questioned during the actual trial;

striking members of the initial pool for cause, in a manner that resembles as closely as possible a manner in which members of the venire will be struck for cause during the actual trial;

permitting a predetermined number of peremptory strikes of members of the initial pool, the number of peremptory strikes permitted corresponding as closely as possible to the number of peremptory strikes that will be permitted at the actual trial;

assembling a probable jury comprising members of the initial pool not struck for cause and not struck using a peremptory strike;

assembling a stricken jury comprising members of the initial pool struck for cause or struck using a peremptory strike;

presenting to both the probable jury and the stricken jury at least a summary of the case to be presented at trial.

17. The method of claim 16, further comprising:

deliberating by the probable jury to obtain a probable jury verdict; and deliberating by the stricken jury to obtain a stricken jury verdict.

18. The method of claim 17, wherein the behaviors of members of the probable jury during deliberations are analyzed, to identify any errors that have been made in failing to strike an opposition juror.

19. The method of claim 17, wherein the behaviors of members of the stricken jury during deliberations are analyzed, to identify any errors that may have been made in striking a favorable juror.

20. A method of providing voir dire training comprising:

assembling an initial pool of potential mock jurors;

questioning members of the initial pool, in a manner that resembles as closely as possible a manner in which a venire will be questioned during the actual trial;

striking members of the initial pool for cause, in a manner that resembles as closely as possible a manner in which members of the venire will be struck for cause during the actual trial;

permitting a predetermined number of peremptory strikes of members of the initial pool, the number of peremptory strikes permitted corresponding as closely as possible to the number of peremptory strikes that will be permitted at the actual trial;

assembling a probable jury comprising members of the initial pool not struck for cause and not struck using a peremptory strike;

assembling a stricken jury comprising members of the initial pool struck for cause or struck using a peremptory strike;

presenting to both the probable jury and the stricken jury at least a summary of the case to be presented at trial.

* * * * *